US 6,704,162 B2

United States Patent
Sato et al.

(10) Patent No.: US 6,704,162 B2
(45) Date of Patent: Mar. 9, 2004

(54) THIN-FILM HEAD FOR REDUCING TRACK WIDTH, PREVENTING WRITE FRINGING AND REDUCING SATURATION

(75) Inventors: Kiyoshi Sato, Niigata-ken (JP); Hideki Gochou, Niigata-ken (JP); Kiyoshi Kobayashi, Niigata-ken (JP); Hisayuki Yazawa, Niigata-ken (JP); Akira Koyama, Niigata-ken (JP); Minoru Yamada, Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 6 days.

(21) Appl. No.: 10/215,761

(22) Filed: Aug. 9, 2002

(65) Prior Publication Data

US 2003/0072104 A1 Apr. 17, 2003

Related U.S. Application Data

(62) Division of application No. 09/643,919, filed on Aug. 23, 2000.

(30) Foreign Application Priority Data

Aug. 30, 1999 (JP) ............................................. 11-243430
Jun. 27, 2000 (JP) ........................................ 2000-192385

(51) Int. Cl.$^7$ ............................................. G11B 5/147
(52) U.S. Cl. ........................................................ 360/126
(58) Field of Search .......................................... 360/126

(56) References Cited

U.S. PATENT DOCUMENTS

| 5,452,164 | A | | 9/1995 | Cole et al. | |
| 5,649,351 | A | | 7/1997 | Cole et al. | |
| 5,652,687 | A | | 7/1997 | Chen et al. | |
| 5,802,700 | A | | 9/1998 | Chen et al. | |
| 5,949,625 | A | | 9/1999 | Sato | |
| 6,069,775 | A | * | 5/2000 | Chang | 360/126 |
| 6,188,544 | B1 | * | 2/2001 | Mino | 360/126 |

* cited by examiner

*Primary Examiner*—A. J. Heinz
(74) *Attorney, Agent, or Firm*—Brinks Hofer Gilson & Lione

(57) ABSTRACT

A track width regulating section having a track width, which is smaller than the resolution obtained by the wavelength of the light used for exposure and development of a resist, is formed between a lower core layer and an upper core layer. Since the width of the upper core layer is larger than the track width, magnetic saturation can be effectively reduced. Inclined faces are formed on the upper surface of the lower core layer so as to be inclined in directions away from the track width regulating section, thereby adequately preventing write fringing.

10 Claims, 6 Drawing Sheets

THIN-FILM HEAD FOR REDUCING TRACK WIDTH, PREVENTING WRITE FRINGING AND REDUCING SATURATION

This application is a divisional application of U.S. application Ser. No. 09/643,919 filed on Aug. 23, 2000, entitled "Thin-Film Magnetic Head for Reduction Track Width, Preventing Write Fringing and Reducing Magnetic Saturation, and Production Method Therefor".

BACKGROUND OF THE INVENTION

1. Field of the Invention

The present invention relates to a thin-film magnetic recording head for use in, for example, a flying magnetic head, and more particularly, to a thin-film magnetic head which is capable of reducing the track width, preventing write fringing, and reducing magnetic saturation, and a production method for the head.

2. Description of the Related Art

FIG. 12 is a partial front view showing the structure of a conventional thin-film magnetic head (inductive head), and FIG. 13 is a partial sectional view of the thin-film magnetic head, taken along line XIII—XIII in FIG. 12, as viewed from the directions of the arrows.

Referring to FIGS. 12 and 13, a lower core layer 1 is made of a magnetic material, such as permalloy, and a nonmagnetic gap layer 7 is formed thereon.

As shown in FIG. 13, a coil layer 5 is formed on the gap layer 7 via an organic insulating layer 4 made of a polyimide, a resist, or the like.

An organic insulating layer 6 made of a polyimide, a resist, or the like is formed on the coil layer 5, and an upper core layer 3 made of a magnetic material, such as permalloy, is formed on the organic insulating layer 6.

As shown in FIG. 12, a leading end portion 3a of the upper core layer 3 opposes the lower core layer 1 via the gap layer 7, and the width thereof is limited to a track width Tw. A base end portion 3b of the upper core layer 3 is magnetically connected to the lower core layer 1.

In the inductive head shown in FIGS. 12 and 13, when a recording current is applied to the coil layer 5, a recording magnetic field is induced in the lower core layer 1 and the upper core layer 3, and a magnetic signal is recorded on a recording medium, such as a hard disk, by a leakage magnetic field from between the leading end portion 3a of the upper core layer 3 and the lower core layer 1.

With future increase in recording density, it is necessary to reduce the track width.

As described above, the track width Tw is regulated by the width of the leading end portion 3a of the upper core layer 3 (see FIG. 12). The upper core layer 3 is formed by so-called flame plating.

In flame plating, a resist layer is first applied over the entire surface where the upper core layer 3 is to be formed, and a pattern of the upper core layer 3 is formed on the resist layer by exposure and development. Subsequently, the pattern is plated with a magnetic material, and the resist layer is removed, thereby finishing the upper core layer 3 having the shape shown in FIGS. 12 and 13.

The resolution of the resist layer is greatly concerned with the wavelength of the light used for exposure and development. The resolution can be improved by shortening the wavelength.

However, the resolution has, of course, its limits, and it is impossible to perform patterning when the track width Tw regulated by the width of the leading end portion 3a of the upper core layer 3 is smaller than the resolution limit. Accordingly, it is difficult for the inductive head with the structure shown in FIGS. 12 and 13 to reduce the track width with future increase in recording density.

When the track width Tw is reduced, the volume of the leading end portion 3a of the upper core layer 3 is decreased, and magnetic saturation becomes pronounced with an increase in recording frequency. This degrades the recording characteristics.

In the inductive head shown in FIGS. 12 and 13, a leakage magnetic field produced between the lower core layer 1 and the leading end portion 3a of the upper core layer 3 protrudes from the track width Tw, that is, so-called write fringing is prone to occur.

When write fringing occurs, the track position on a recording medium cannot be detected precisely, an tracking servo error is caused, and the recording characteristics are degraded.

Write fringing is prone to be caused when the lower core layer 1 protrudes from the track width Tw, as shown in FIG. 12, and the distance between the protruding portion of the lower core layer 1 and the leading end portion 3a of the upper core layer 3 is short.

Japanese Unexamined Patent Application Publication No. 10-143817 discloses the structure of an inductive head which effectively prevents write fringing described above.

However, the invention disclosed in the above publication makes the production procedure troublesome. That is, the production procedure includes a process of removing the portion of the gap layer 7 protruding from the track width Tw shown in FIG. 12. While an appropriate distance can be formed between the lower core layer 1 and the leading end portion 3a of the upper core layer 3 by etching the surface of the lower core layer 1, which is exposed by removing the portion of the gap layer 7, by ion milling, magnetic powders adhere to both side faces of the leading end portion 3a and the like. A process of removing the adhering powders is also required.

Furthermore, the disclosed invention does not allow reduction in track width and prevention of magnetic saturation.

SUMMARY OF THE INVENTION

The present invention solves to the above conventional problems, and an object of the present invention is to provide a thin-film magnetic head which is capable of reducing the track width, preventing write fringing, and reducing magnetic saturation, and a production method for the head.

According to an aspect of the present invention, there is provided a thin-film magnetic head including upper and lower core layers, and a track width regulating section disposed between the upper and lower core layers so as to have a width shorter than those of the upper and lower core layers, wherein the track width regulating section is composed of a lower pole layer connected to the lower core layer, an upper pole layer connected to the upper core layer, and a gap layer disposed between the lower pole layer and the upper pole layer, or is composed of an upper pole layer connected to the upper core layer and a gap layer disposed between the upper pole layer and the lower core layer, and an inclined face is formed on the upper surface of the lower core layer extending on both sides of the track width regulating section so as to be inclined away from the track width regulating section in the track width direction in order to gradually increase the distance from the upper core layer.

As described above, the track width regulating section, whose width in the track width direction is regulated by the track width, is formed between the upper core layer and the lower core layer. The upper pole layer magnetically connected to the upper core layer is formed in the track width regulating section. Since the inclined face inclined in the direction away from the upper core layer is formed on the upper surface of the lower core layer extending from both sides of the track width regulating section, an appropriate distance is ensured between the upper pole layer and the lower core layer, and write fringing can be effectively prevented.

The width of the upper core layer formed on the upper pole layer is larger than the track width. This adequately reduces magnetic saturation adjacent to the leading end portion of the upper core layer.

In a production method which will be described later, the width of the track width regulating section (=the track width) can be made smaller than the resolution obtained by the wavelength of the light used for exposure and development of a resist, which allows the track width to be reduced with future increase in recording density.

Preferably, the track width to be regulated by the width of the track width regulating section is 0.4 μm or less. This value is smaller than the resolution obtained when the i-line is used during exposure and development of the resist. More preferably, the track width is set at 0.2 μm or less.

Preferably, an inclination angle θ1 of the inclined face formed on the upper surface of the lower core layer with respect to the track width direction ranges from 2° to 10°. Within this range, it is possible to adequately suppress write fringing and to sufficiently maintain the shielding function of the lower core layer.

According to another aspect of the present invention, there is provided a thin-film magnetic head including upper and lower core layers having a width larger than the track width, and a track width regulating section disposed between the upper and lower core layers so as to have a width limited to the track width, wherein the track width regulating section is composed of a lower pole layer connected to the lower core layer, an upper pole layer connected to the upper core layer, and a gap layer disposed between the lower pole layer and the upper pole layer, or is composed of an upper pole layer connected to the upper core layer and a gap layer disposed between the upper pole layer and the lower core layer, and the track width regulated by the track width regulating section is 0.4 μm or less.

As described above, the track width regulating section, whose width in the track width direction is limited to the track width, is formed between the lower core layer and the upper core layer. Since the width of the upper core layer is larger than the track width, the volume of the upper core layer adjacent to the leading end thereof is increased, and magnetic saturation is adequately reduced.

In a production method which will be described later, the width of the track width regulating section (=the track width) can be made smaller than the resolution obtained by the wavelength of the light used for exposure and development of a resist.

In particular, the track width is set at 0.4 μm or less, and this value is smaller than the resolution limit obtained when the i-line is used for exposure and development. More preferably, the track width is set at 0.2 μm.

Preferably, an inclined face is formed on the upper surface of the lower core layer extending on both sides of the track width regulating section so as to be inclined away from the track width regulating section in the track width direction to gradually increase the distance from the upper core layer.

While the upper pole layer magnetically connected to the upper core layer is formed in the track width regulating section, the above-described configuration allows an appropriate distance between the upper pole layer and the lower core layer and thereby effectively suppresses write fringing.

Preferably, an inclination angle θ1 of the inclined face formed on the upper surface of the lower core layer with respect to the track width direction ranges from 2° to 10°.

Preferably, the height of the track width regulating section ranges from 2 μm to 10 μm. Within this range, an appropriate distance is ensured between the lower core layer and the upper pole layer, and write fringing is suppressed. Furthermore, the height of the upper pole layer is increased, and magnetic saturation is seldom caused even when the recording density is increased. Furthermore, the track width regulating section can be easily formed.

Preferably, the gap layer is made of a nonmagnetic metal material which can be plated. The nonmagnetic metal material may include one or more among NiP, NiPd, NiW, NiMo, Au, Pt, Rh, Pd, Ru, and Cr.

According to a further aspect of the present invention, there is provided with a thin-film magnetic head production method including the steps of (a) forming a resist layer on a lower core layer and forming, in the resist layer, a groove having a predetermined width and a predetermined length from the surface opposing a recording medium in the height direction; (b) forming, in the groove, a track width regulating section composed of a lower pole layer, a nonmagnetic gap layer, and an upper pole layer stacked in order or composed of a nonmagnetic gap layer and an upper pole layer stacked in order; (c) removing the resist layer; (d) limiting the width of the track width regulating section to the track width by etching both side faces of the track width regulating section in the track width direction; (e) forming an inclined face on the upper surface of the lower core layer extending on both sides of the track width regulating section so as to be inclined away from the track width regulating section to gradually increase the distance from the upper core layer; and (f) forming an upper core layer having a width larger than the track width on the track width regulating section.

As described above, the resist layer is first applied on the lower core layer, and a pattern of the track width regulating section is formed on the resist layer by exposure and development. The width of the pattern to become the track width regulating section is greatly concerned with the wavelength of the light used for exposure and development. For example, when the i-line (the wavelength thereof=365 nm) is used, the width can be reduced to approximately 0.4 μm.

The value of 0.4 μm is the resolution limit obtained when the i-line is used, and a pattern having a width smaller than 0.4 μm cannot be formed on the resist layer.

Accordingly, after the track width regulating section is formed in the pattern of the resist layer, the width thereof (=the track width) is further reduced by etching both side faces of the track width regulating section in the track width direction. For this reason, for example, when the width of the pattern formed on the resist layer is approximately 0.4 μm that is the resolution limit obtained by the i-line used for exposure and development, the width of the track width regulating section can be limited to 0.4 μm or less. In this way, the present invention allows the width of the track width regulating section (=the track width) to be smaller than the resolution obtained by the i-line.

The production method includes the step of forming an inclined face on the upper surface of the lower core layer extending from both ends of the track width regulating section so as to be inclined away from the track width regulating section to gradually decrease the thickness of the lower core layer. This adequately prevents write fringing.

Since the upper core layer having a width larger than the track width is formed on the upper pole layer constituting the track width regulating section by, for example, flame plating, it is possible to increase the volume of the upper core layer adjacent to the leading end thereof and to adequately reduce magnetic saturation.

Preferably, the step (d) of limiting the width of the track width regulating section and the step (e) of forming the inclined face are simultaneously performed by ion milling. This simplifies the production method.

Preferably, the ion irradiation angle θ2 for ion milling ranges from 45° to 75° with respect to the direction in parallel with the height direction of the track width regulating section. More preferably, the ion irradiation angle θ2 ranges from 55° to 70°.

The above ion irradiation angle θ2 makes it possible to reduce the track width without extremely reducing the height of the upper pole layer, as shown by the experimental result, which will be described later. Moreover, the inclined face can be easily formed on the upper surface of the lower core layer by setting the ion irradiation angle θ2 at the above value.

Preferably, the track width to be regulated by the track width regulating section in the above step (d) is set at 0.4 μm or less.

The track width set at 0.4 μm or less can be made smaller than the resolution limit obtained when the i-line is used for exposure and development of a resist. More preferably, the track width is set at 0.2 μm or less.

Preferably, the inclined face formed on the upper surface of the lower core layer in the step (e) has the inclination angle θ1 ranging from 2° to 10° with respect to the track width direction.

By setting the ion irradiation angle θ2 for ion milling within the range of 45° to 75°, it is possible to make the track width 0.4 μm or less and to form the inclined face on the upper surface of the lower core layer at the inclination angle θ1 ranging from 2° to 10° with respect to the track width direction.

Preferably, the gap layer constituting the track width regulating section is formed by plating together with the pole layer. This allows the pole layer and the gap layer to be successively formed by plating.

Preferably, a nonmagnetic metal material to be plated to form the gap layer includes one or more among NiP, NiPd, NiW, NiMo, Au, Pt, Rh, Pd, Ru, and Cr.

Further objects, features and advantages of the present invention will become apparent from the following description of the preferred embodiments with reference to the attached drawings.

DESCRIPTION OF THE PREFERRED EMBODIMENTS

Figure 1:
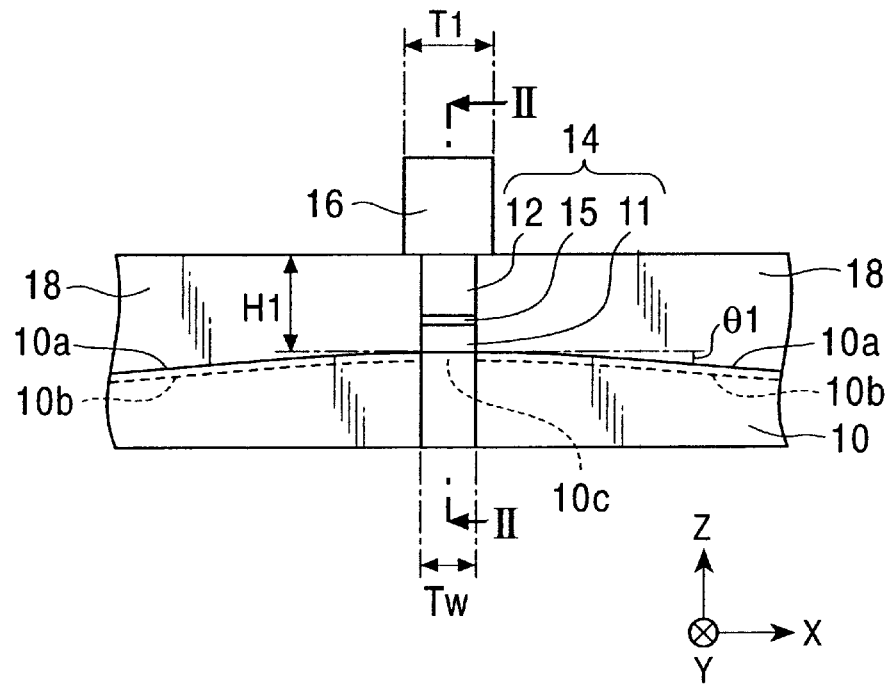
FIG. 1 is a partial front view showing the structure of a thin-film magnetic head according to a first embodiment of the present invention.
Figure 2:
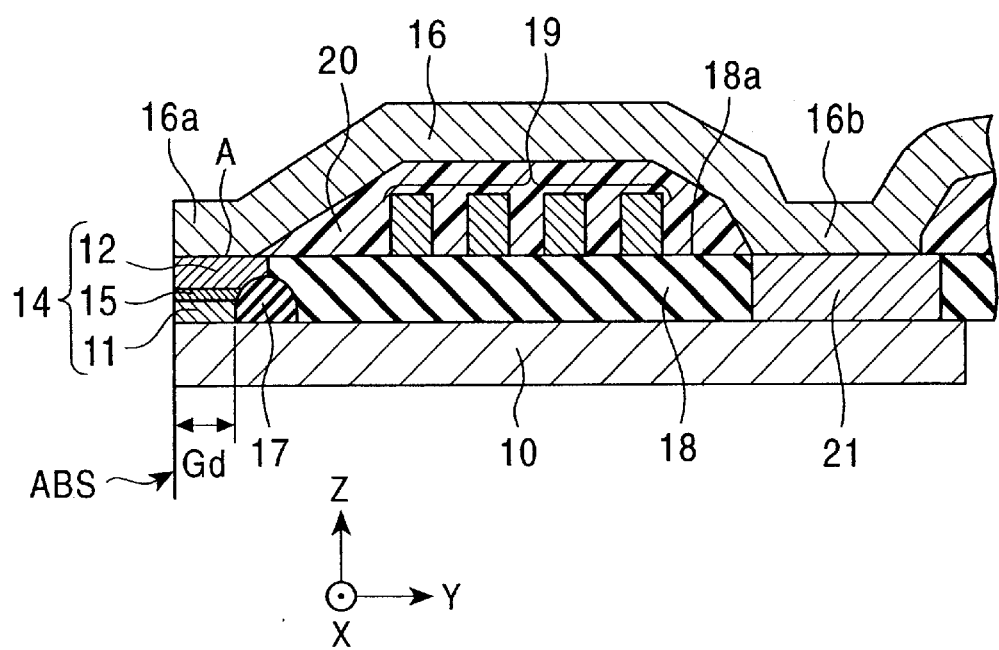
FIG. 2 is a partial sectional view of the thin-film magnetic head, taken along line II—II in FIG. 1.

FIG. 1 is a partial front view showing the structure of a thin-film magnetic head according to a first embodiment of the present invention, and FIG. 2 is a partial sectional view of the thin-film magnetic head, taken along line II—II in FIG. 1 and viewed from the direction of the arrows.

A thin-film magnetic head shown in FIG. 1 is an inductive head for recording. In the present invention, a playback head (MR head) using a magnetoresistive effect may be placed under the inductive head.

Referring to FIGS. 1 and 2, a lower core layer 10 is made of a magnetic material such as permalloy. In a case in which a playback head is placed under the lower core layer 10, a shielding layer for protecting a magnetoresistive element from noise may be provided separately from the lower core layer 10, or the lower core layer 10 may also function as an upper shielding layer of the playback head.

As shown in FIG. 1, a track width regulating section 14 is formed on the lower core layer 10 so as to have a track width Tw. Preferably, the track width Tw is set to be 0.4 μm or less, and more preferably, to be 0.2 μm or less.

In the present invention, the width of the track width regulating section 14, that is, the track width Tw, can be set to be smaller than the resolution obtained by the wavelength of the light to be used for exposure and development of a resist in a production method, which will be described later. The above-described value of 0.4 μm is the resolution limit in a case in which the i-line is used to form a pattern on a resist by exposure and development. According to the present invention, the track width Tw can be limited to be smaller than the resolution of the i-line.

In the embodiment shown in FIGS. 1 and 2, the track width regulating section 14 has a three-layer structure composed of a lower pole layer 11, a gap layer 15, and an upper pole layer 12. The pole layers 11 and 12 and the gap layer 15 will be described below.

As shown in FIGS. 1 and 2, the lower pole layer 11 serving as the lowermost layer of the track width regulating section 14 is formed on the lower core layer 10 by plating, and is magnetically connected to the lower core layer 10. The lower pole layer 11 may be made of the same material as that of the lower core layer 10, or may be made of a different material. Furthermore, the lower pole layer 11 may be formed of a single-layer film or a multilayered film.

The gap layer 15, which is nonmagnetic, is formed on the lower pole layer 11. It is preferable that the gap layer 15 be made of a nonmagnetic metal material and be formed on the lower pole layer 11 by plating. Furthermore, it is preferable to select one or more among NiP, NiPd, NiW, NiMo, NiRh, Au, Pt, Rh, Pd, Ru, and Cr as the nonmagnetic metal material. The gap layer 15 may be formed of a single-layer film or a multilayered film.

The upper pole layer 12 is formed on the gap layer 15 by plating so as to be magnetically connected to an upper core layer 16, which will be described later. The upper pole layer 11 may be made of the same material as that of the upper core layer 16, or may be made of a different material. Furthermore, the upper pole layer 16 may be formed of a single-layer film or a multilayered film.

When the gap layer 15 is made of a nonmagnetic metal material, as described above, the lower pole layer 11, the gap layer 15, and the upper pole layer 12 can be successively formed by plating.

While the lower pole layer 11 and the upper pole layer 12 constituting the track width regulating section 14 may be made of the same material as that of the core layer to be magnetically connected thereto or may be of different materials, as described above, it is preferable, in order to improve recording density, that the lower pole layer 11 and the upper pole layer 12 opposing the gap layer 15 have a higher saturation magnetic flux density than that of the core layer to be magnetically connected thereto. The lower pole layer 11 and the upper pole layer 12 having such a high saturation magnetic flux density allow a recording magnetic field to be concentrated adjacent to the gap and thereby improve recording density.

As shown in FIG. 1, the track width regulating section 14 has a height H1. For example, the thicknesses of the lower pole layer 11, the gap layer 15, and the upper pole layer 12 are set to be approximately 0.4 μm, approximately 0.2 μm, and approximately 2 μm.

Preferably, the height Hi of the track width regulating section 14 is set to be within the range of 2.0 μm to 3.0 μm, and more preferably, within the range of 2.3 μm to 2.5 μm.

Within the above height range, it is possible to obtain an appropriate distance between the lower core layer 10 and the upper pole layer 12, and to thereby suppress write fringing. Moreover, since the height and volume of the upper pole layer 12 can be increased, magnetic saturation can be suppressed at a higher recording density.

The track width regulating section 14 is produced by forming a groove in a resist layer and plating the interior of the groove with metal materials for the magnetic layers, as will be described later. When the track width regulating section 14 has the above height, it can be easily produced so as to allow a groove of a predetermined shape and of a predetermined size to be easily formed in the resist layer by exposure and development and so as to respond to reduction in track width.

The track width regulating section 14 is formed, as shown in FIG. 2, to have a predetermined length from a surface opposing a recording medium (an ABS) in the height direction (the Y-direction in the figure). A gap-depth-determining insulating layer 17 is formed of an organic insulating material, such as a resist or a polyimide, on the lower core layer 10.

The gap-depth-determining insulating layer 17 serves to regulate the gap depth (Gd) which has a great effect on the electric characteristics of the thin-film magnetic head. The gap depth is determined by the length from the front end face of the gap-depth-determining insulating layer 17 to the ABS. As shown in FIG. 2, the gap-depth-determining insulating layer 17 allows a sufficient length of the upper pole layer 12 in the height direction (the Y-direction) and a sufficient volume thereof. This prevents magnetic saturation and improves the recording characteristics.

It may be arbitrarily determined whether or not to form the gap-depth-determining insulating layer 17. When the gap-depth-determining insulating layer 17 is not provided, the gap depth is determined by the length of the track width regulating section 14 in the height direction.

As shown in FIG. 2, an insulating layer 18 extends from the rear end of the track width regulating section 14 in the height direction. The insulating layer 18 is, for example, an inorganic insulating layer made of an inorganic material. It is preferable to select, as the inorganic material, one or more among $Al_2O_3$, SiN, and $SiO_2$.

Furthermore, it is preferable that an upper surface 18a of the insulating layer 18 be formed flat so as to be flush with a joint surface, serving as a reference plane A, between the upper pole layer 12 and the upper core layer 16, which will be described later.

A coil layer 19 is patterned on the insulating layer 18 in a spiral form. Since the upper surface 18a of the insulating layer 18 is flat, the coil layer 19 can be precisely formed so that conductive portions are formed with a reduced pitch therebetween.

Such reduction in pitch between the conductive portions makes it possible to reduce the length of the upper core layer 16 in the height direction, to reduce the magnetic path length formed via the lower core layer 10, and to improve recording characteristics.

It is preferable that the coil layer 19 be composed of a conductive material layer and a protective layer placed thereon. In this case, preferably, the conductive material layer is formed of a nonmagnetic conductive layer having a single-layer or multilayered structure containing either or both Cu and Au, and the protective layer is formed of a nonmagnetic conductive layer having a single-layer or multilayered structure containing one or more selected among elements Ni, NiP, Pd, Pt, B, and Au.

Before an organic insulating layer 20 is formed on the patterned coil layer 19, the coil layer 19 is sometimes exposed to the atmosphere. In this case, the protective layer serves to prevent the coil layer 19 from being oxidized.

As shown in FIG. 2, the organic insulating layer 20 made of an organic material, such as a resist or a polyimide, is formed on the coil layer 19, and the upper core layer 16 made of a magnetic material, such as permalloy, is formed on the organic insulating layer 20 by flame plating or by another method.

A leading end portion 16a of the upper core layer 16 is formed on the upper pole layer 12 so as to be magnetically connected thereto, and a base end portion 16b is formed on a connecting magnetic layer (backgap layer) 21 made of a magnetic material on the lower core layer 10 so as to be magnetically connected thereto. In the present invention, the connecting magnetic layer 21 may be omitted. In this case, the base end portion 16b of the upper core layer 16 is in direct contact with the lower core layer 10.

In the inductive head shown in FIGS. 1 and 2, when a recording current is applied to the coil layer 19, a recording magnetic field is induced in the lower core layer 10 and the upper core layer 16, and a leakage magnetic field is produced between the lower pole layer 11 and the upper pole layer 12 opposing via the gap layer 15 in the track width regulating section 14. In response to this leakage magnetic field, a magnetic signal is recorded on a recording medium such as a hard disk.

The present invention provides the inductive head with the configuration shown in FIG. 1 in order to reduce the track width for further increase in recording density, to adequately prevent write fringing, and to reduce magnetic saturation.

In the inductive head shown in FIG. 1, the track width regulating section 14, in which the width in the track width direction (the X-direction) is limited to the track width Tw, is formed between the lower core layer 10 and the upper core layer 16.

Since the width of the track width regulating section 14 is set to be smaller than the resolution obtained by the wavelength of the light used for exposure and development of the resist, as described above, reduction in track width can be adequately achieved. More specifically, the track width Tw can be limited to 0.4 μm or less, more preferably, to 0.2 μm or less.

In the present invention, the upper core layer 16 has a width T1 in the track width direction (the X-direction), as shown in FIG. 1. The width T1 is set to be larger than the track width Tw. For this reason, it is possible to increase the volume of the upper core layer 16 adjacent to the leading end portion 16a and to more adequately reduce magnetic saturation.

As shown in FIG. 1, inclined faces 10a are formed on the upper surface of the lower core layer 10 extending from both sides of the track width regulating section 14 so as to be inclined in directions away from the track width regulating section 14.

Since the lower core layer 10 and the upper pole layer 12 constituting the track width regulating section 14 are properly separated by the inclined faces 10a, a leakage magnetic field produced from the upper pole layer 12 is prevented from protruding from the track width Tw by the influence of the width of the lower core layer 10. This suppresses so-called write fringing.

Preferably, an inclination angle θ1 formed by a parallel line extending in parallel with the track width direction (the X-direction in the figure) and the inclined face 10a ranges from 2° to 10°.

When the inclination angle θ1 of the inclined face 10a is less than 2°, a leakage magnetic flux is prone to be produced between the lower core layer 10 and the upper pole layer 12, and the effect of suppressing write fringing cannot be anticipated.

An inclination angle θ1 of the inclined face 10a larger than 10° is effective in suppressing write fringing. However, in a case in which the lower core layer 10 also functions as a shielding layer of a magnetoresistive element (not shown), when the inclination angle θ1 exceeds 10°, the thickness of the lower core layer 10, in particular, adjacent to both sides thereof, is decreased, or the width itself of the lower core layer 10 in the track width direction (the X-direction in the figure) is decreased. This impairs the function of the lower core layer 10 as a shielding layer of the magnetoresistive element.

As shown in FIG. 1, a protuberance 10c may be formed on the upper surface of the lower core layer 10 so as to extend in the Z-direction in the figure. In this case, the upper surface of the protuberance 10c is joined to the base end of the track width regulating section 14. Preferably, inclined faces 10b are formed on the upper surface of the lower core layer 10 extending from the base end of the protuberance 10c so as to be inclined in directions away from the track width regulating direction 14. While the protuberance 10c shown in FIG. 1 is shaped like a rectangle having a width equal to the track width Tw, it may be formed in another shape. For example, the protuberance 10c may be shaped like a trapezoid having the upper surface of the track width Tw and both side faces inclined so that the width gradually increases toward the lower core layer 10 (in the direction opposite from the Z-direction in the figure).

In the present invention, the lower core layer 10 need not be provided with the inclined faces 10a or 10b, and the upper surface of the lower core layer 10 may be formed in parallel with the track width direction (the X-direction). In this case, however, the above-described write fringing is more likely to occur, compared with a case in which the inclined faces 10a or 10b are formed.

The present invention provides the advantages of adequately reducing the track width and effectively suppressing magnetic saturation even when the upper surface of the lower core layer 10 is in parallel with the track width direction, and this differs from the conventional inductive head. When the lower core layer 10 has the protuberance 10c, the lower core layer 10 and the upper pole layer 12 can be separated, and therefore, write fringing can be effectively suppressed without the inclined faces 10b.

Figure 3:
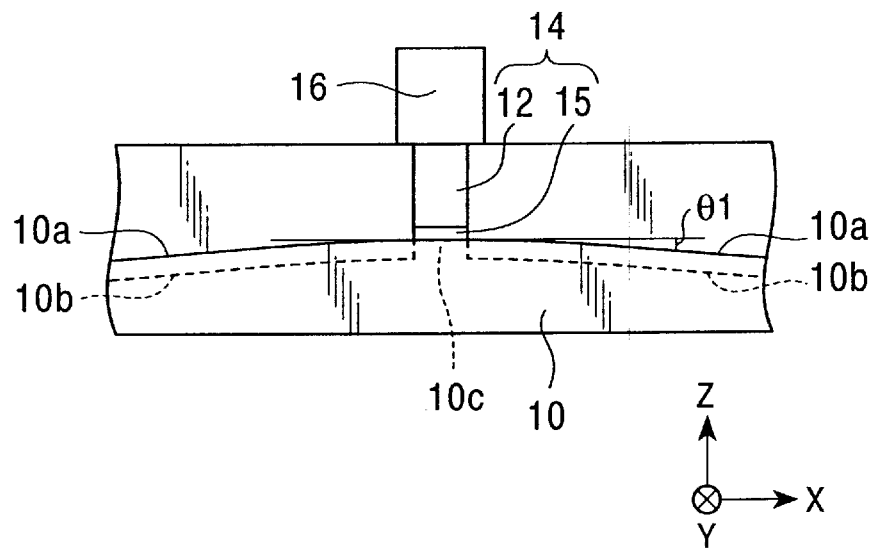
FIG. 3 is a partial front view showing the structure of a thin-film magnetic head according to a second embodiment of the present invention.

FIG. 3 is a partial front view showing the structure of a thin-film magnetic head according to a second embodiment of the present invention.

This embodiment is similar to the first embodiment shown in FIG. 1 except for the layer structure of a track width regulating section 14.

As shown in FIG. 3, the track width regulating section 14 is composed of two layers, a gap layer 15 and an upper pole layer 12.

Inclined faces 10a are formed on the upper surface of a lower core layer 10 extending from the base end of the gap layer 15 so as to be inclined in directions away from the track width regulating section 14. This allows write fringing to be adequately suppressed.

A protuberance 10c extending in the Z-direction in the figure may also be formed on the upper surface of the lower core layer 10, and the upper surface of the protuberance 10c may be joined to the base end of the track width regulating section 14. Preferably, inclined faces lob are formed on the upper surface of the lower core layer 10 extending from the base end of the protuberance 10c so as to be inclined in directions away from the track width regulating section 14. This allows write fringing to be adequately suppressed.

Figure 6:
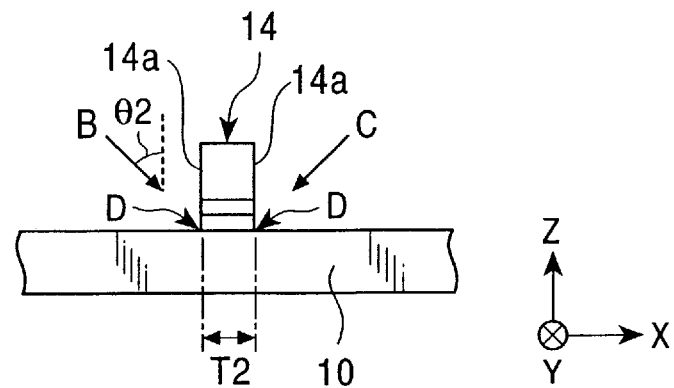
FIG. 6 is a process view showing a process to be performed subsequent to the process shown in FIG. 5.
Figure 7:
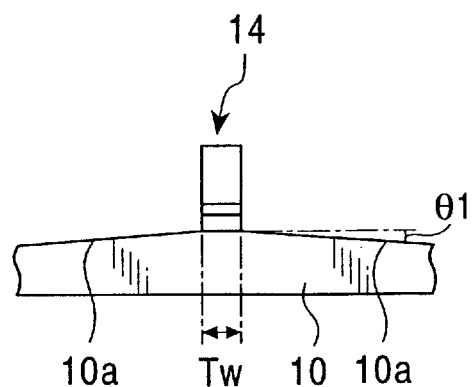
FIG. 7 is a process view showing a process to be performed subsequent to the process shown in FIG. 6.
Figure 8:
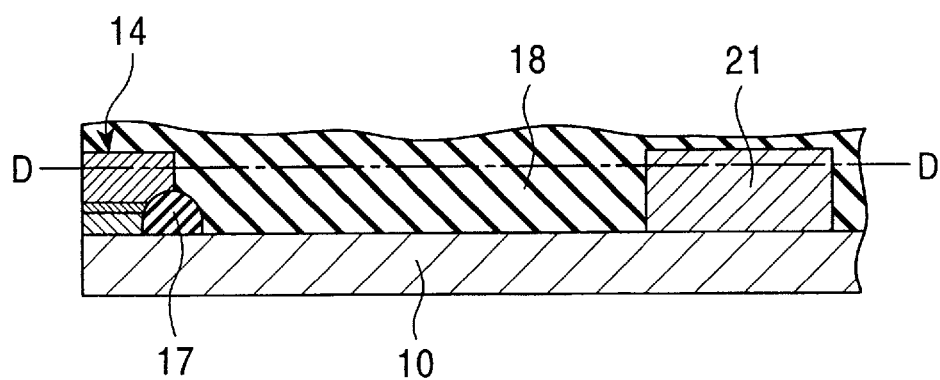
FIG. 8 is a process view showing a process to be performed subsequent to the process shown in FIG. 7.
Figure 9:
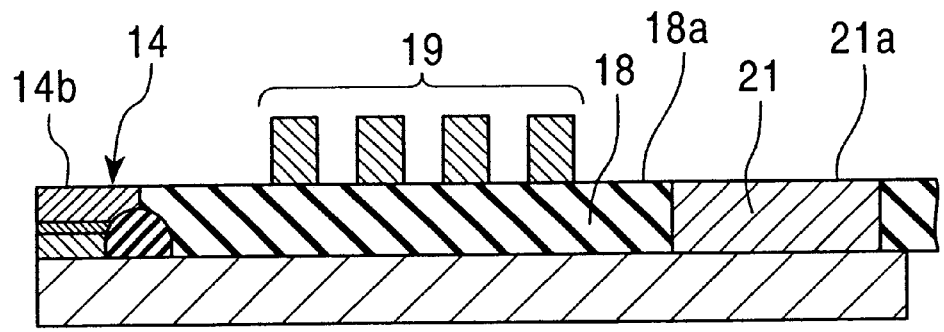
FIG. 9 is a process view showing a process to be performed subsequent to the process shown in FIG. 8.
Figure 10:
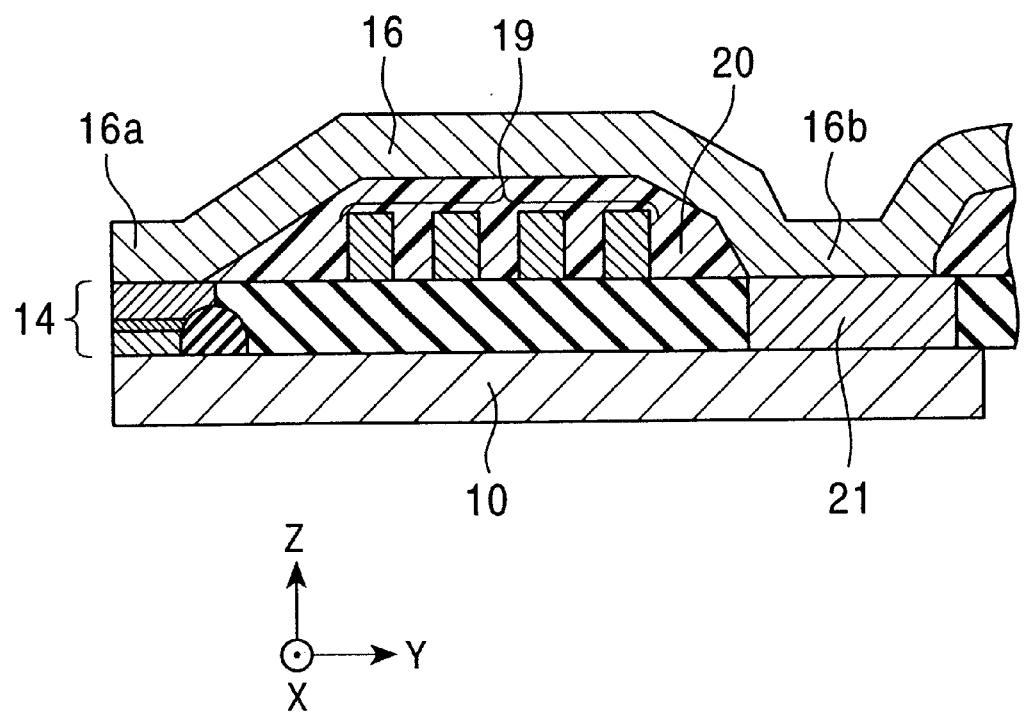
FIG. 10 is a process view showing a process to be performed subsequent to the process shown in FIG. 9.

FIGS. 4 to 10 are process views showing a production method for the thin-film magnetic head (inductive head) of the present invention shown in FIGS. 1 and 2. FIGS. 4 to 7 are partial front views, and FIGS. 8 to 10 are partial longitudinal sectional views.

In a case in which a gap-depth-determining insulating layer 17 is formed, as shown in FIG. 8 and subsequent figures, it must be formed on a lower core layer 10 beforehand.

Figure 4:
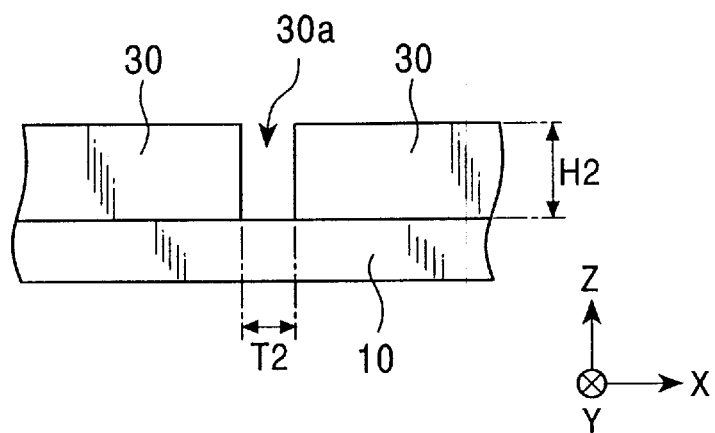
FIG. 4 is a process view showing a production method for the thin-film magnetic head according to the present invention.

Referring to FIG. 4, first, a resist layer 30 having a thickness H2 is applied on the lower core layer 10.

Then, a groove 30a is patterned by exposure and development in the resist layer 30 so as to form a track width regulating section 14 therein. As shown in FIG. 4, the groove 30a has a width T2 in the track width direction (the X-direction) and a predetermined length in the height direction (the Y-direction).

For example, when the i-line is used for exposure and development, the width T2 of the groove 30a formed in the resist layer 30 can be reduced to approximately 0.4 µm. The value of 0.4 µm is the resolution limit obtained by the i-line, and the width T2 of the groove 30a cannot be smaller than the value.

In order to improve resolution, it is only necessary to use light having a shorter wavelength during exposure and development. In order to make the resolution higher than that when the i-line is used, an excimer laser may be used. When the excimer laser is used, the width T2 of the groove 30a formed in the resist layer 30 can be reduced to approximately 0.3 µm.

Figure 5:
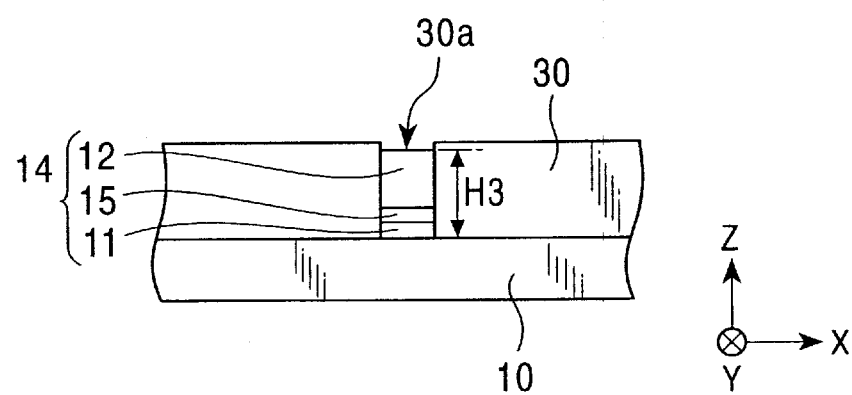
FIG. 5 is a process view showing a process to be performed subsequent to the process shown in FIG. 4.

Subsequently, the track width regulating section 14 is formed in the groove 30a of the resist layer 30, as shown in FIG. 5. In the embodiment of the present invention, the track width regulating section 14 has a multilayered structure in which a lower pole layer 11, a gap layer 15, and an upper pole layer 12 are stacked from the bottom in that order. The lower pole layer 11 is formed by electroplating or by another method so as to be magnetically connected to the lower core layer 10. The upper pole layer 12 is formed by electroplating or by another method so as to be magnetically connected to an upper core layer 16.

In the present invention, it is preferable that the gap layer 15 be formed together with the pole layers 11 and 12 by plating. This allows the pole layers 11 and 12 and the gap layer 15 to be successively formed by plating.

As a nonmagnetic metal material to be used for plating for forming the gap layer 15, it is preferable to select one or more among NiP, NiPd, NiW, NiMo, Au, Pt, Rh, Pd, Ru, and Cr.

The track width regulating section 14 need not have a three-layer structure composed of the lower pole layer 11, the gap layer 15, and the upper pole layer 12, and may have, for example, a two-layer structure composed of the gap layer 15 and the upper pole layer 12.

As shown in FIG. 5, the track width regulating section 14 has a height H3. The height H3 is set to be equal to or slightly smaller than the thickness H2 of the resist layer 30.

The height H3 is also set to be larger than the height H1 of the track width regulating section 14 shown in FIG. 1. That is, the height H2 itself of the resist layer 30 for regulating the height of the track width regulating section 14 is set beforehand to be larger than the height H1 in the process shown in FIG. 4.

The height H3 is determined in consideration of the height Hi of the track width regulating section 14, the amount of polishing in a polishing process using chemical-mechanical polishing (CMP) shown in FIG. 7, and the like.

The height of the track width regulating section 14 is reduced by approximately 1 µm in the polishing process, and is also reduced in an ion milling process shown in FIG. 6.

As described above, in the present invention, it is preferable that the height Hi of the track width regulating section 14 (see FIG. 1) after production be within the range of 2 µm to 3 µm, more preferably, within the range of 2.3 µm to 2.5 µm. In order to ensure the above height H1, it is preferable that the height H3 of the track width regulating section 14 shown in FIG. 5 be set to be within the range of 3.5 µm to 5.0 µm, more preferably, within the range of 4.0 µm to 4.2 µm, in consideration of the polishing and ion milling processes.

After the track width regulating section 14 is formed in the groove 30a of the resist layer 30 in the above-described manner, a connecting magnetic layer 21 shown in FIG. 2 is formed.

The connecting magnetic layer 21 is formed on the lower core layer 10 by removing the resist layer 30 after the process shown in FIG. 5, forming a resist layer again, forming a pattern of the connecting magnetic layer 21 on the resist layer, and plating the pattern with a magnetic material.

FIG. 6 shows a state in which the resist layer for forming the connecting magnetic layer 21 is removed.

As shown in FIG. 6, only the track width regulating section 14 stands adjacent to the ABS on the lower core layer 10. In this state, the width of the track width regulating section 14 is further reduced by etching both side faces 14a thereof in the track width direction (the X-direction in the figure).

In the present invention, both side faces 14a of the track width regulating section 14 are etched by, for example, ion milling using an Ar (argon) gas neutralized and ionized.

As shown in FIG. 6, ion milling is performed from the oblique directions (the directions of the arrows B and C). When ions are applied from these directions, both side faces 14a of the track width regulating section 14 are gradually etched by a physical action, thereby reducing the width of the track width regulating section 14.

As described above, it is preferable that the gap layer 15 constituting the track width regulating section 14 be made of a nonmagnetic metal material by plating. In this case, since the gap layer 15 and the pole layers 11 and 12 are etched at nearly the same milling rate, both side faces 14a of the track width regulating section 14 are adequately etched in the same planar shape.

The width of the track width regulating section 14 is regulated as the track width Tw. According to the present invention, the track width Tw can be made smaller than the resolution limit obtained by the wavelength of the light used during exposure and development of the resist.

That is, while the groove 30a is formed in a portion of the resist layer 30, where the track width regulating section 14 is to be formed, in the process shown in FIG. 4, the width T2 of the groove 30a is equal to at least the resolution limit obtained by the wavelength of the light used during exposure and development, and cannot be further reduced.

Therefore, while the track width regulating section 14 is formed in the groove 30a of the resist layer 30 so as to have the width T2 (see FIG. 6), in the present invention, the width of the track width regulating section 14 can be made smaller than T2 by etching both side faces 14 thereof by ion milling or by another method. In other words, the track width Tw of the track width regulating section 14 can be made smaller than the resolution limit obtained by the wavelength of the light used during exposure and development of the resist (see FIG. 7).

For example, in a case in which the i-line is used for exposure and development of the resist layer 30, the width T2 of the groove 30a to be formed in the resist layer 30 is approximately 0.4 µm at a minimum. In the present invention, the width of the track width regulating section 14 (=the track width Tw) can be reduced to 0.4 µm or less by etching both side faces 14a of the track width regulating section 14 by ion milling in the process shown in FIG. 6. Furthermore, the track width Tw can be reduced to 0.2 µm or less by controlling the ion milling period and the ion irradiation angle.

When both side faces 14a of the track width regulating section 14 have been etched by ion milling, the width of the track width regulating section 14 is set as the track width Tw, as shown in FIG. 7. Simultaneously, the upper surface of the lower core layer 10 extending from both sides of the track width regulating section 14 is also obliquely etched by ion milling, whereby inclined faces 10a are formed thereon.

In this way, two processes, the process of limiting the width of the track width regulating section 14 to the track width Tw by etching both side faces 14a of the track width regulating section 14 and the process of forming the inclined faces 10a on the upper surface of the lower core layer 10, can be simultaneously performed by ion milling. For example, in order to prevent magnetic powders produced by etching the lower core layer 10 from adhering thereto again and to set the inclination angle θ1 of the inclined faces 10a formed on the lower core layer 10 to be within a predetermined range (the above-described range of 2° to 10°), it is necessary to appropriately set the ion irradiation angle θ2 during ion milling (the angle of irradiation of ions with respect to the height direction (the Z-direction) of the track width regulating section 14).

In the present invention, it is preferable that the ion irradiation angle θ2 be set to range from 45° to 75°.

According to the experimental results, which will be described later, when the ion irradiation angle θ2 ranges from 45° to 75°, the etching rate of both side faces of the track width regulating section 14 is a positive value. This makes it possible to properly etch both side faces of the track width regulating section 14 and to limit the track width Tw to 0.4 µm or less.

On the other hand, while the upper surface of the upper pole layer 12 (that is, the upper surface of the track width regulating section 14) is etched by the ion irradiation, the etching rate thereof is highest when the ion irradiation angle θ2 is within the range of 40° to 45°. Therefore, the etching rate can be decreased by setting the ion irradiation angle θ2 to be 45° or more, and the height of the track width regulating section 14 can be prevented from being excessively reduced.

In the case of the above ion irradiation angle θ2, since the etching rate at joint portions D between the lower core layer 10 and the track width regulating section 14 is a positive value, the joint portions D are adequately etched, and there is no fear that the upper surface of the lower core layer 10 will raised due to magnetic powders adhering again thereto during ion milling.

Figure 12:
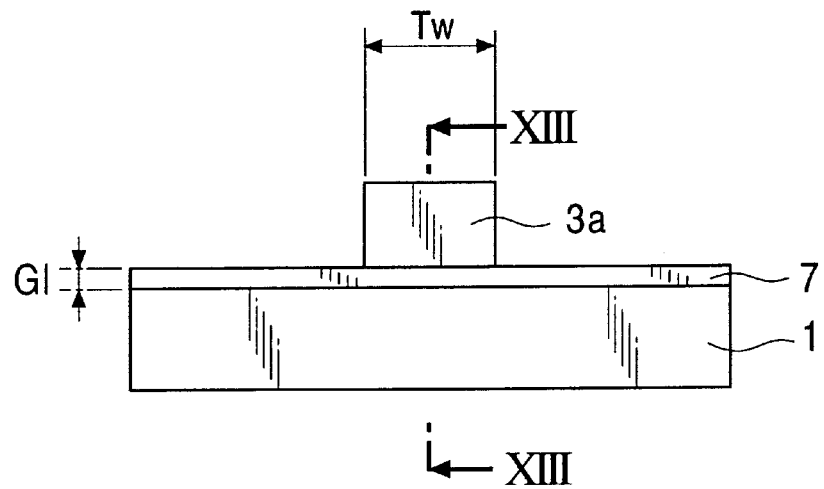
FIG. 12 is a partial front view showing the structure of a conventional thin-film magnetic head.
Figure 13:
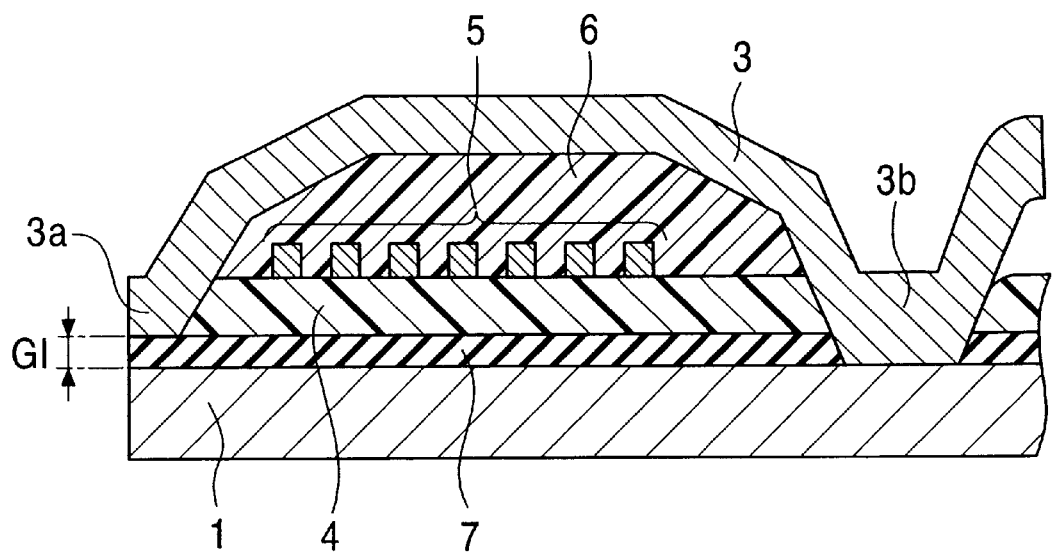
FIG. 13 is a partial sectional view of the conventional thin-film magnetic head, taken along line XIII—XIII in FIG. 12.

As described above, the conventional thin-film magnetic head (see FIG. 12) requires the process of etching the surfaces of the gap layer 7 protruding from the track width Tw and the lower core layer 1 formed thereunder by ion milling, and the process of removing the substances adhering again to the upper core layer 3 due to ion milling. In contrast, since the track width regulating section 14 of the present invention has a three plated layer structure including the gap layer 15 and has a protuberance, the above ion milling is unnecessary. For this reason, the substances are prevented from adhering again due to ion milling.

In the present invention, even when the width of the track width regulating section 14 in the track width direction is made slightly larger than a predetermined width before the ion milling process (FIG. 5), the track width Tw can be easily caused to fall within a predetermined width range by correcting the amount of etching of both side faces 14a of the track width regulating section 14.

In the process shown in FIG. 4, before the resist layer 30 is formed, an underplate layer is formed on the upper surface of the lower core layer 10 in order to form the track width regulating section 14 thereon. In the process shown in FIG. 6, the underplate layer, excluding a portion disposed under the track width regulating section 14, is adequately removed by ion milling. Therefore, it is unnecessary to consider a process of removing the underplate layer.

As described above, the track width Tw of the track width regulating section 14 can be made 0.4 µm or less, more preferably, 0.2 µm or less, by performing ion milling at the ion irradiation angle θ2. Moreover, the inclination angle θ1 of the inclined faces 10a formed on the upper surface of the lower core layer 10 can be controlled so as to be within the range of 2° to 10°.

In particular, when the ion irradiation angle θ2 is within the range of 55° to 70°, as shown by the experimental results, which will be described later, it is possible to adjust the etching rate at both side faces of the track width regulating section 14, the etching rate on the upper surface of the upper pole layer 12, and the etching rate at the joint portions D between the lower core layer 10 and the track width regulating section 14 so that the etching rates are within their respective appropriate ranges, and to easily set the track width Tw of the track width regulating section 14 and the inclination angle θ1 of the inclined surfaces 10a within the above predetermined ranges without any influence of re-adhesion due to ion milling.

While ion milling is performed with the ion irradiation angle θ2 fixed at an angle within the range of 45° to 75°, since the appropriate ranges of the etching rate for setting the track width Tw within a predetermined range and the etching rate for forming the inclined faces 10a on the upper surface of the lower core layer 10 are different, for example, it may be possible to reduce the track width Tw by etching both side faces 14a of the track width regulating section 14 with the ion irradiation angle θ2 set within the range of 60° to 75°, and to then form the inclined faces 10a having an appropriate inclination angle θ1 on the upper surface of the lower core layer 10 with the ion irradiation angle θ2 changed to the range of 45° to 60°.

Since the joint portions D between the lower core layer 10 and the track width regulating section 14 can be properly etched as long as the ion irradiation angle θ2 is within the above range, the protuberance 10c shown in FIGS. 1 and 3 can be formed on the lower core layer 10. Alternatively, the protuberance 10c may be formed by etching only the upper surface of the lower core layer 10 by ion milling, in which the ion irradiation angle with respect to the lower core layer 10 is substantially vertical (0° to approximately 15°), before the process shown in FIG. 6 of etching both side faces 14a of the track width regulating section 14, and the ion milling process shown in FIGS. 6 and 7 may then be performed.

Thereby, the protuberance 10c is formed on the lower core layer 10, as shown in FIGS. 1 and 3, and the inclined faces 10b are formed on the upper surface of the lower core layer 10 extending from the base end of the protuberance 10c so as to be inclined to gradually reduce the thickness of the lower core layer 10 in directions away from the track width regulating section 14.

Next, the lower core layer 10 is covered with an insulating layer 18, as shown in FIG. 8. In this case, the track width regulating section 14 and the connecting magnetic layer 21 are also covered with the insulating layer 18.

In the present invention, the insulating layer 18 is made of an inorganic material by sputtering. It is preferable to select, as the inorganic material, one or more among $Al_2O_3$, SiN, and $SiO_2$.

As shown in FIG. 8, the surface of the insulating layer 18 is ground to the line D—D, for example, by CMP so that the surface of the track width regulating section 14 is exposed. An upper surface 18a of the insulating layer 18 is thereby formed to be flat and to be flush with a surface 14b of the track width regulating section 14, as shown in FIG. 9. A surface 21a of the connecting magnetic layer 21 is also exposed by the above polishing process using CMP.

As described above, the height of the track width regulating section 14 is reduced by approximately 1 $\mu$m by the polishing process. After this process, the height H1 (see FIG. 1) of the track width regulating section 14 is within the range of 2 $\mu$m to 3 $\mu$m.

Subsequently, a coil layer 19 is patterned on the insulating layer 18 in a spiral form, as shown in FIG. 9. Since the surface 18a of the insulating layer 18 is flat, as described above, the coil layer 19 can be formed precisely. This makes it possible to form conductive portions with a smaller pitch therebetween.

As shown in FIG. 10, the coil layer 19 is covered with an organic insulating layer 20 made of an organic material, such as a resist or a polyimide, and an upper core layer 16 is patterned on the organic insulating layer 20 by an existing method such as flame plating. A leading end portion 16a of the upper core layer 16 is in contact with the track width regulating section 14, and a base end portion 16b thereof is in magnetic contact with the connecting magnetic layer 21 on the lower core layer 10.

The width of the leading end portion 16a of the upper core layer 16 in the track width direction (the X-direction) is set at T1, which is larger than the track width Tw, as shown in FIGS. 1 and 3. The leading end portion 16a thus has a width T1 which is larger than the track width Tw because the track width Tw is already determined by the width of the upper pole layer 12 separate from the upper core layer 16.

Since the width of the leading end portion 16a of the upper core layer 16 is thus larger than the track width Tw, it is possible to form the upper core layer 16 with a higher pattern accuracy than previously (that is, compared with a case in which the width of the leading end portion 16a is limited to the track width Tw). Furthermore, since the width T1 of the leading end portion 16a of the upper core layer 16 can be increased, the volume of the upper core layer 16 can also be increased and magnetic saturation can be adequately suppressed.

In the present invention, examinations were made of the relationship between the ion irradiation angle and the etching rate at an arbitrary point during ion milling performed in the process shown in FIG. 6.

In an experiment, first, an inductive head having a shape shown in FIG. 6 was produced. In this case, the width T2 of a track width regulating section 14 in the track width direction (the X-direction) was set to be within the range of 0.55 $\mu$m to 0.6 $\mu$m. The height H3 of the track width regulating section 14 was set to be within the range of 4 $\mu$m to 4.2 $\mu$m.

The etching rate on both side faces of the track width regulating section 14, the etching rate on the upper surface of an upper pole layer 12, and the etching rate at joint portions (portions indicated by the letter D in FIG. 6) between a lower core layer 10 and the track width regulating section 14 were measured while changing the ion irradiation angle $\theta2$ (see FIG. 6). The results of the experiment are shown in FIG. 11.

Figure 11:
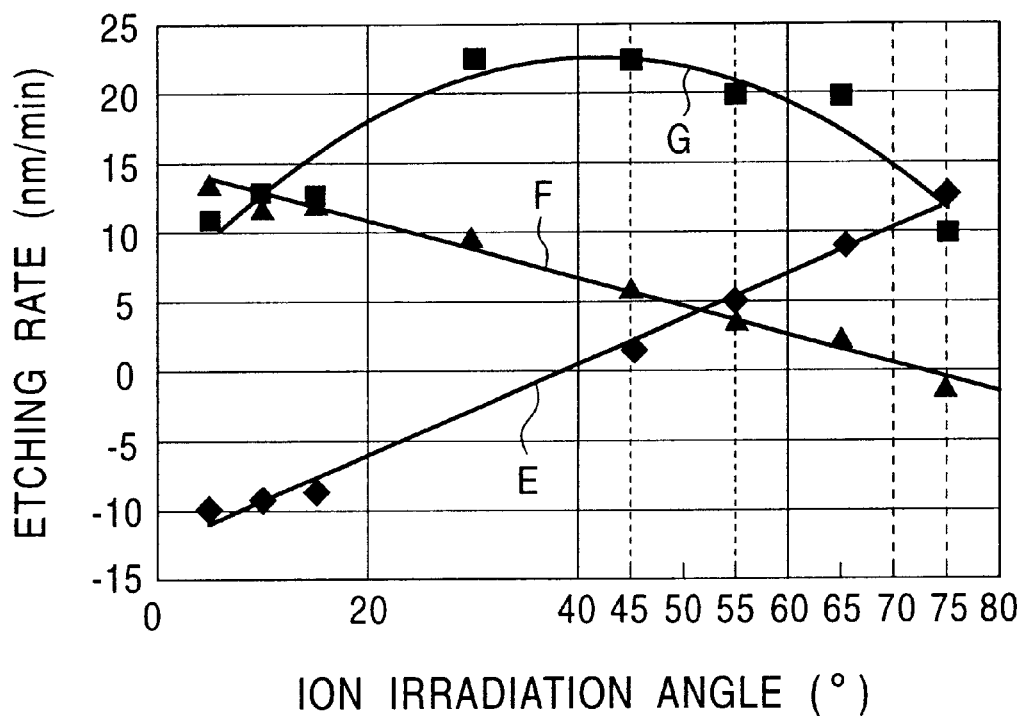
FIG. 11 is a graph showing the relationship between the ion irradiation angle θ2 for ion milling and the etching rates measured at a plurality of arbitrary points.

As shown in FIG. 11, the etching rate E on both side faces of the track width regulating section 14 linearly increases as the ion irradiation angle $\theta2$ increases.

FIG. 11 shows that the etching rate E has a negative value when the ion irradiation angle $\theta2$ is within the range of 0° to approximately 40°. This means that magnetic powders produced by ion milling adhere again. Within the above range of the ion irradiation angle $\theta2$, magnetic powders chipped off the lower core layer 10 and the like adhere to both side faces of the track width regulating section 14, thereby increasing the width T2 of the track width regulating section 14 in the track width direction.

That is, in order to reduce the width T2 of the track width regulating section 14 and to thereby ensure a track width Tw of 0.4 $\mu$m or less, the etching rate E must have at least a positive value.

The etching rate G on the upper surface of the upper pole layer 12 is highest when the ion irradiation angle $\theta2$ is approximately 40° to 45°, and gradually decreases when the ion irradiation angle $\theta2$ further increases.

As shown in FIG. 11, the etching rate G has a positive value regardless of the ion irradiation angle $\theta2$. That is, the upper surface of the upper pole layer 12 is etched by ion milling, and the height of the upper pole layer 12 is reduced. However, it is preferable that the height of the upper pole layer 12 not be reduced as much as possible. This is because the volume of the upper pole layer 12 decreases as the height thereof decreases, and magnetic saturation is easily caused at a higher recording density. Therefore, it is preferable that the etching rate G have as small a positive value as possible.

The etching rate F at the joint portion D of the lower core layer 10 linearly decreases as the ion irradiation angle $\theta2$ increases. In particular, when the ion irradiation angle $\theta2$ exceeds approximately 75°, the etching rate F is a negative value. This means that magnetic powders produced by ion milling adhere again.

It is satisfactory as long as at least the etching rate F is not a negative value. When the etching rate F is a negative value, magnetic powders removed from the track width regulating section 14 and the like by etching adhere to the joint portions D of the lower core layer 10, and the joint portions D are raised. Since this shortens the distance between the lower core layer 10 and the upper pole layer 12, write fringing is worsened.

From the above point of view, the ion irradiation angle $\theta2$ is set to be within the range of 45° to 75°. Within this range, the etching rate E on both side faces of the track width regulating section 14 is a large positive value, as shown in FIG. 11, and therefore, the width T2 of the track width regulating section 14 in the track width direction can be reduced. In the present invention, it has been confirmed that the track width Tw can be reduced to 0.2 $\mu$m or less.

In contrast, when the ion irradiation angle $\theta2$ is within the above range, the etching rate G on the upper surface of the upper pole layer 12 is a positive value, but tends to decrease. When ion milling was completed, the height of the track width regulating section 14 measured approximately 3.3 $\mu$m to 3.5 $\mu$m.

When the ion irradiation angle $\theta2$ is within the above range, the etching rate F at the joint portions D of the lower core layer 12 shows a positive value, and re-adhesion of magnetic powders due to ion milling is prevented. Therefore, it is possible to form the protuberance 10c shown in FIG. 1 in the lower core layer 10.

The above ion irradiation angle $\theta2$ allows the inclination angle $\theta1$ of the inclined faces 10a formed on the upper surface of the lower core layer 10 to fall within the range of 2° to 10°.

It is more preferable that the ion irradiation angle $\theta2$ be within the range of 55° to 70°. This range makes it possible to adequately reduce the etching rate on the upper surface of the upper pole layer 12, to make the etching rate on both side faces of the track width regulating section 14 a positive large value, and to reliably make the etching rate at the joint portions D of the lower core layer 10 a positive value.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A thin-film magnetic head comprising:

upper and lower core layers; and a track width regulating section disposed between said upper and lower core layers so as to have a width shorter than those of said upper and lower core layers, wherein said track width regulating section is composed of a lower pole layer connected to said lower core layer, an upper pole layer connected to said upper core layer, and a gap layer disposed between said lower pole layer and said upper pole layer, or is composed of an upper pole layer connected to said upper core layer and a gap layer disposed between said upper pole layer and said lower core layer, wherein an inclined face is formed on the upper surface of said lower core layer extending on both sides of said track width regulating section so as to be inclined away from said track width regulating section in the track width direction in order to gradually increase the distance from said upper core layer, and wherein an inclination angle $\theta 1$ of said inclined face formed on the upper surface of said lower core layer with respect to the track width direction is within the range of 2° to 10°.

2. A thin-film magnetic head according to claim 1, wherein the width of said track width regulating section is 0.4 $\mu$m or less.

3. A thin-film magnetic head comprising:

upper and lower core layers; and a track width regulating section disposed between said upper and lower core layers so as to have a width shorter than those of said upper and lower core layers, wherein said track width regulating section is composed of a lower pole layer connected to said lower core layer, an upper pole layer connected to said upper core layer, and a gap layer disposed between said lower pole layer and said upper pole layer, or is composed of an upper pole layer connected to said upper core layer and a gap layer disposed between said upper pole layer and said lower core layer, wherein an inclined face is formed on the upper surface of said lower core layer extending on both sides of said track width regulating section so as to be inclined away from said track width regulating section in the track width direction in order to gradually increase the distance from said upper core layer, and wherein the width of said track width regulating section is more than zero, and 0.2 $\mu$m or less.

4. A thin-film magnetic head according to claim 3, wherein an inclination angle $\theta 1$ of said inclined face formed on the upper surface of said lower core layer with respect to the track width direction is within the range of 2° to 10°.

5. A thin-film magnetic head comprising:

upper and lower core layers; and a track width regulating section disposed between said upper and lower core layers so as to have a width shorter than those of said upper and lower core layers, wherein said track width regulating section is composed of a lower pole layer connected to said lower core layer, an upper pole layer connected to said upper core layer, and a gap layer disposed between said lower pole layer, and said upper pole layer, wherein an inclined face is formed on the upper surface of said lower core layer extending on both sides of said track width regulating section so as to be inclined away from said track width regulating section in the track width direction in order to gradually increase the distance from said upper core layer, and wherein an inclination angle $\theta 1$ of said inclined face formed on the upper surface of said lower core layer with respect to the track width direction is within the range of 2° to 10°.

6. A thin-film magnetic head comprising:

upper and lower core layers; and a track width regulating section disposed between said upper and lower core layers so as to have a width shorter than those of said upper and lower core layers, wherein said track width regulating section is composed of an upper pole layer connected to said upper core layer and a gap layer disposed between said upper pole layer and said lower core layer, wherein an inclined face is formed on the upper surface of said lower core layer extending on both sides of said track width regulating section so as to be inclined away from said track width regulating section in the track width direction in order to gradually increase the distance from said upper core layer, and wherein an inclination angle $\theta 1$ of said inclined face formed on the upper surface of said lower core layer with respect to the track width direction is within the range of 2° to 10°.

7. A thin-film magnetic head comprising:

upper and lower core layers; and a track width regulating section disposed between said upper and lower core layers so as to have a width shorter than those of said upper and lower core layers, wherein said track width regulating section is composed of a lower pole layer connected to said lower core layer, an upper pole layer connected to said upper core layer, and a gap layer disposed between said lower pole layer and said upper pole layer, wherein an inclined face is formed on the upper surface of said lower core layer extending on both sides of said track width regulating section so as to be inclined away from said track width regulating section in the track width direction in order to gradually increase the distance from said upper core layer, and wherein the width of said track width regulating section is more than zero, and 0.2 $\mu$m or less.

8. A thin-film magnetic head according to claim 7, wherein an inclination angle $\theta 1$ of said inclined face formed on the upper surface of said lower core layer with respect to the track width direction is within the range of 2° to 10°.

9. A thin-film magnetic head comprising:

upper and lower core layers; and a track width regulating section disposed between said upper and lower core layers so as to have a width shorter than those of said upper and lower core layers, wherein said track width regulating section is composed of an upper pole layer connected to said upper core layer and a gap layer disposed between said upper pole layer and said lower core layer, wherein an inclined face is formed on the upper surface of said lower core layer extending on both sides of said track width regulating section so as to be inclined away from said track width regulating section in the track width direction in order to gradually increase the distance from said upper core layer, and wherein the width of said track width regulating section is more than zero, and 0.2 μm or less.

10. A thin-film magnetic head according to claim 9, wherein an inclination angle θ1 of said inclined face formed on the upper surface of said lower core layer with respect to the track width direction is within the range of 2° to 10°.

* * * * *